Sept. 26, 1950     E. M. SANTEE ET AL     2,523,723
CARGO RAMP Filed Dec. 6, 1946     3 Sheets-Sheet 1

INVENTORS
WILLIAM J. HESS
BY    EDWIN M. SANTEE
RALPH H. BURKHARD
*Reynolds & Beach*
ATTORNEYS Sept. 26, 1950     E. M. SANTEE ET AL     2,523,723
CARGO RAMP Filed Dec. 6, 1946                                          3 Sheets-Sheet 2

INVENTORS
WILLIAM J. HESS
BY   EDWIN M. SANTEE
RALPH H. BURKHARD
*Reynolds & Beach*
ATTORNEYS Sept. 26, 1950     E. M. SANTEE ET AL     2,523,723
CARGO RAMP Filed Dec. 6, 1946                          3 Sheets-Sheet 3

INVENTORS
WILLIAM J. HESS
EDWIN M. SANTEE
RALPH H. BURKHARD
BY Reynolds & Beach
ATTORNEYS Patented Sept. 26, 1950

2,523,723

UNITED STATES PATENT OFFICE 2,523,723

CARGO RAMP

Edwin M. Santee and Ralph H. Burkhard, Seattle, Wash., and William J. Hess, Great Falls, Mont., assignors to Boeing Airplane Company, a corporation of Delaware Application December 6, 1946, Serial No. 714,466

20 Claims. (Cl. 214—85)

This invention relates to cargo ramps, more particularly to those suitable for moving cargo into and out of the fuselage of an airplane through a bottom opening.

A principal object of the invention is to provide a ramp construction which is permanently attached to the airplane, and which can be raised from load supporting position into stored position, or vice versa, by mechanism permanently installed in the airplane fuselage. Preferably the cargo handling hoist is utilized for moving the ramp in this fashion.

It is a further object to provide such ramp mechanism which can be housed compactly in the airplane fuselage, and which, in its stored position, can be latched securely to hold it in place against inadvertent release.

A further object is to make the mechanism for supporting the ramp in its load-carrying position adjustable for accommodating loads having different characteristics. The particular type of adjustment preferred enables the ramp to be arranged either as an incline of substantially uniform slope throughout its length, or one having a lower portion of relatively gradual inclination and an upper portion of relatively steep inclination.

Additional advantages of the ramp construction, and particularly those inherent in the control and latching mechanism for it, will be pointed out in the detailed description of a representative type of ramp installation which follows.

A typical installation of the ramp structure is that shown in the drawings for supporting loads, and more particularly vehicles, such as trucks, for movement into and out of a bottom opening in an airplane fuselage located a substantial distance above the ground. The airplane fuselage 1 is represented somewhat diagrammatically, and is shown as having an opening 10 in the bottom of it located well toward the tail of the fuselage, although such opening might be in the nose portion of the fuselage. The fuselage may be generally circular in cross section, or formed of two unequal substantially circular segments, the larger being above the smaller. In either event, forward of the opening 10 the fuselage may be divided longitudinally by a substantially horizontal partition 11 into an upper compartment 12 and a lower compartment 13, each of circular segmental shape in cross section. Such partition will serve as a cargo supporting floor for the upper compartment, and as a ceiling for the lower compartment.

Since the ramp structure is intended primarily for use by wheeled vehicles, it may consist of two trackways, preferably of channel shape, with flanges projecting upward. Each trackway includes a normally upper section 2 and a normally lower section 20 connected together by a hinge 21. The upper end of the upper section may be suspended from the fuselage partition 10 by a hinge 22, so that it constitutes a supporting section which carries the supported section 20 hinged to it. The lower end of the latter section may have a small plate 23 mounted on it by a hinge 24 to bridge the gap between the ground and the lower end of ramp section 20 caused by its thickness.

Figure 1:
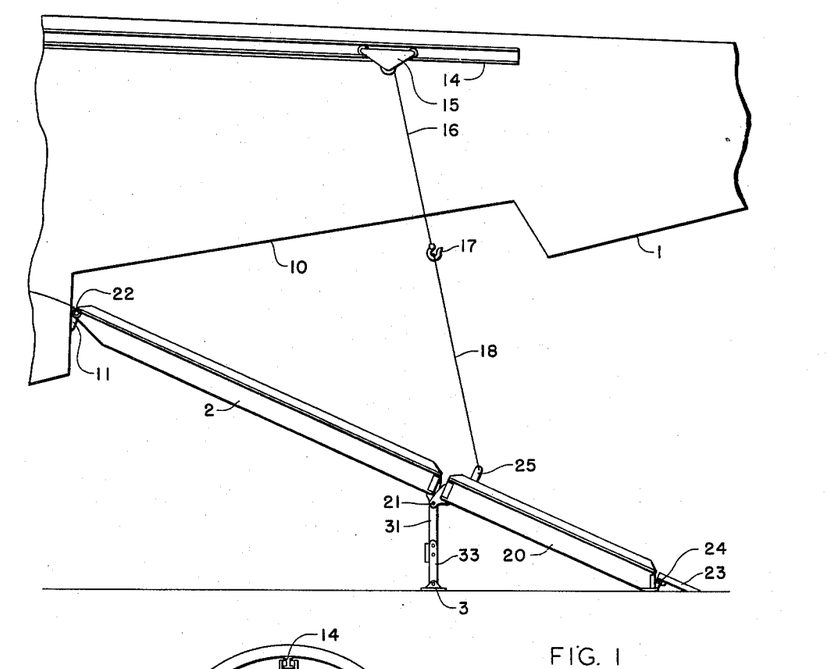
Figure 1 is a side elevation view of a ramp in load-carrying position, showing operating mechanism in condition to initiate movement of the ramp toward stored position.
Figure 5:
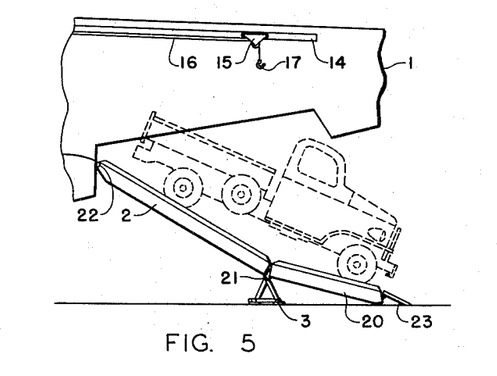
Figure 5 is a side elevation view of the ramp in a load-carrying position different from that shown in Figure 1.
Figure 6:
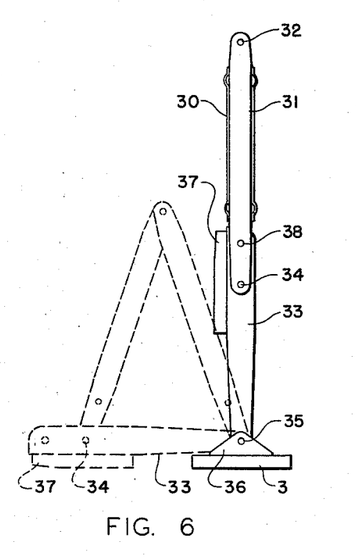
Figure 6 is a side elevation view of a ramp stand.
Figure 7:
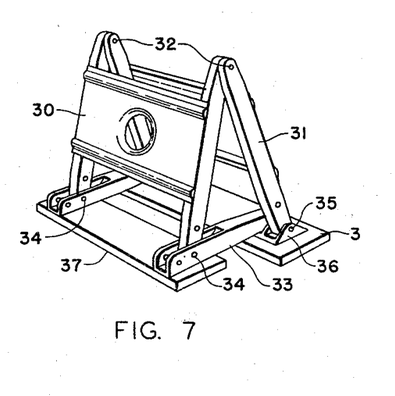
Figure 7 is a top perspective view of such stand shown in a different position of adjustment corresponding to the broken line position of Figure 6.

Each ramp element is divided into two sections arranged end to end for two principal reasons: first, so that it may be folded to shorten its overall length in being moved to stored position, and second, so that it may be adjusted between the aligned relationship of the two ramp sections shown in Figure 1 and the dihedral relationship of such sections shown in Figure 5. The hinge 21 interconnecting the ramp sections further forms a convenient connection for a supporting stand 3 which constitutes an intermediate support to reduce the bending loads on the ramp between its ends below those which would be produced in a continuous ramp not supported centrally. This stand, as shown best in Figs. 6 and 7, is composed of two upper frames 30 and 31, interconnected at their upper ends by hinges 32. Each of these frames is stiffened by a sheet metal stiffener plate, as shown.

A lower frame 33 is hinged at one end to the upper frame 30 by pivots 34, and at its other end is pivoted to the support base by pins 35 received in suitable brackets 36 mounted on the base. This lower frame includes a plate 37 extending parallel to the base of the support.

When the stand is in its extended position the lower frame 33 will be aligned in a substantially vertical plane with the upper frames 30 and 31. These frames will be held in this position by pins 38 passing through apertures in the legs of all three frames. Such three frames are thus secured together as a rigid unit, supported at one end by the pivots 35 connecting the base to the lower frame 33, and at the other end by the pivots 32 connecting the upper frames to the hinge 21 interconnecting the two ramp sections 2 and 20. In order to alter the stand from its extended condition to its contracted condition, as shown in Fig. 7 and in broken lines in Fig. 6, the pin 38 is removed and the lower frame 33 is allowed to swing about its pivot 35 until its plate 37 lies on the ground in parallel spaced relationship to the base of the stand. The lower ends of the upper frames 30 and 31 may now be spread, and pins aligned with pivots 35 extended through holes in the lower ends of the legs of frame 31 and registering holes in brackets 36 carried by the base, to form a rigid isosceles triangular structure.

In its contracted condition the stand will be stronger than in its extended position, which is desirable because the principal reason for lowering the ramp into the position of Fig. 5, in which it is supported by the stand in contracted position, is for loading or unloading over the ramp vehicles too high to pass through the fuselage opening when the ramp sections are in the aligned position shown in Fig. 1, in which they are supported by the stand in its extended condition. Such larger vehicles are, of course, usually also heavier. Since not all the loads carried by cargo airplanes are in the form of wheeled vehicles, however, it is usually desirable to install a hoist permanently in the airplane fuselage. In this instance the hoist serves the dual function of loading cargo into and unloading it from the fuselage, and of raising and lowering the ramp elements between their load-carrying and stored positions.

Such hoist includes a track 14 secured to the ceiling of the upper cargo compartment 12, along which track runs a carriage 15 between a position substantially directly above the ramp section interconnecting hinge 21 and a position closer to, or even beyond, a position above the hinged end of ramp section 2. The position of the carriage lengthwise of its track may be controlled in any suitable fashion, and the carriage supports the hoisting cable 16 having the hook 17 secured to its end. In order to employ the cargo hoist for moving the ramps into stored position a cable 18, having its ends secured one to each of the ramp runways by suitable lugs 25 on them, may be engaged by the hook 17. Preferably these lugs are mounted on the lower ramp sections 20 at their ends adjacent to the ramp section interconnecting hinges 21.

Figure 4:
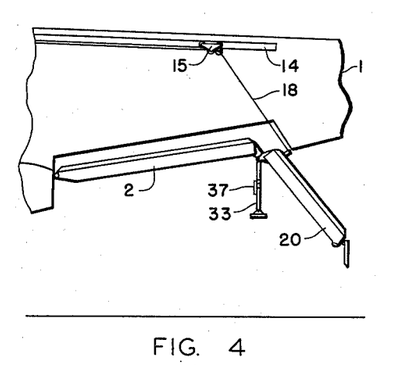
Figure 4 is a similar view showing the ramp in a position intermediate its load-carrying and its stored positions.

The length and location of lugs 25 with respect to the axis of hinges 21, and taking into account the location of such hinges and the comparative weights of the ramp sections 2 and 20, will be such that the upward force required on cables 16 and 18 cannot create a moment about the axis of hinges 21 sufficient to swing the lower sections 20 up while maintaining them in alignment with the ramp sections 2 as they are lifted. On the contrary, whether the ramp units are being raised or lowered, the supported sections will droop, as indicated in Fig. 4. Consequently, if the ramp units are being lifted beyond the positions of the parts shown in Fig. 4, and the carriage 15 is moved away from a position above the ramp lugs 25 and toward a position directly above the hinges 22 mounting the supporting ramp sections 2, the lever arm through which the lifting force acts about hinges 21 at first will decrease progressively in length as the supporting ramp sections swing farther upward. Consequently the droop of the supported ramp sections 20 will become more pronounced.

Figure 3:
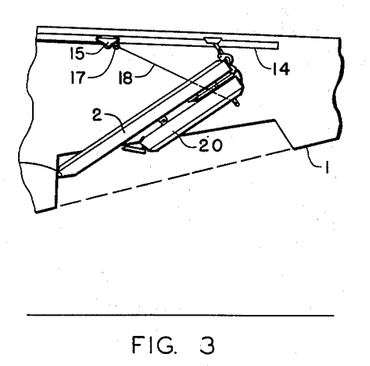
Figure 3 is a side elevation view of the ramp structure in stored position.

As the hoist carriage 15 continues to move farther away from a location directly above the ramp lugs 25, and the supporting ramp sections 20 swing farther upward, it will be evident that at a position of the ramp sections 2 between those shown in Fig. 4 and Fig. 3 the direction of pull effected by cable 18 will cross over the axis of hinges 21. At that time the line along which the force is applied to the ramp lugs will shift across such hinge axis, so that instead of tending to swing the supported sections 20 of the ramp units up into alignment with their supporting sections 2, such force will act in a direction to fold each supported section back beneath its supporting section. By the time the supporting section of each ramp has been swung upward into its stored position, the supported ramp section will be folded into the positions close alongside the supporting section shown in Fig. 3, with the stand 3 between them. Thereafter the ramp units may be maintained in this folded condition merely by keeping tension on the cable 18.

Figure 2:
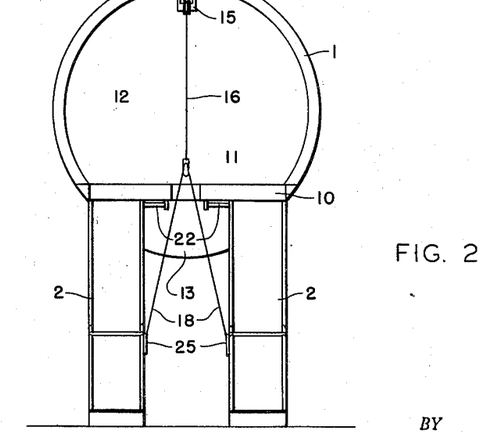
Figure 2 is an end elevation view of the ramp installation in the same condition.

To reduce the space required to house the ramp elements when in stored position, the hinges 22 may support the ends of ramp sections 2 for sliding movement toward and away from each other transversely of their lengths. To enable such movement the pivot rods of hinges 22 are considerably longer than the width of the ramp elements, as shown in Fig. 2. Approach movement of the ramp elements will enable their upper ends to lie closer together when in stored position, and consequently they can be moved closer to the ceiling of the compartment 12, while they may be shifted farther apart in lowered position to correspond to the wheel spacing of vehicles to be moved over them.

It may not be convenient or desirable to maintain the cable 18 under tension for the purpose of holding the ramp units in stored position, and consequently in Figs. 8 to 12, inclusive, latch mechanism is illustrated which will secure them in the stored position described, even though the hoist cable is completely slackened. This latch mechanism is composed of two units, namely, an upper unit 4 engageable with the swinging end of the supporting ramp section 2, to hold it in its upper position, and a lower unit 5 interengageable between the supporting ramp section and the supported section 20, to retain the latter section in relationship folded alongside the former section. These latch units are of generally similar character, and the interrelated for release by the same control mechanism.

The latch mechanism 4 includes a tube 40 secured to a suitable stationary support 19 carried by the fuselage 1 and braced by a rod 41 to support its depending end. Preferably the upper end of tube 40 is pivoted to the structure 19, and rod 41, also pivoted to such structure and to the opposite end of tube 40, may be adjustable in effective length to locate the lower end of the tube in precisely the proper position relative to the swinging end of the ramp section 2 in raised position. Carried by the lower end of tube 40 is a latch element 42 pivoted to such tube by pin 43. It is preferred that such latch element include two rigidly interconnected side plates receiving this tube between them. The latch element is bifurcated to form a pointed, hooked, ramp-engaging finger 42' and a curved resetting finger 42" disposed in spaced relationship. These fingers extend solidly between the side plates of the latch elements, as indicated in dotted lines in Figure 9, shaping the cavity between the plates to engage the end of tube 40 to limit swinging of the latch element in its latching and released positions. A rod 26 carried by the ramp section 2 coacts with the fingers of the latch element as will be described hereafter.

Figures 8, 9, 10, 11, 12:
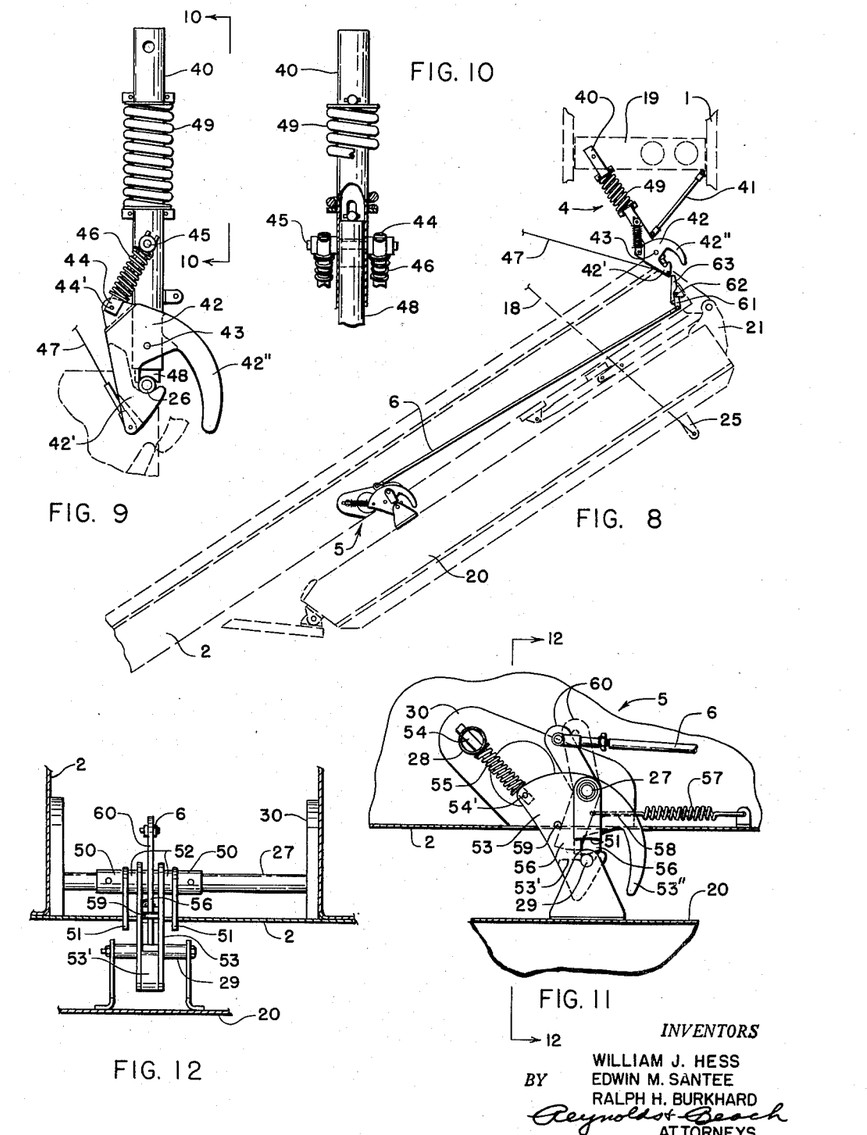
Figure 8 is a side elevation view of part of the ramp in stored position.
Figure 9 is a side elevation view of a fragment of the ramp structure showing the upper latch unit connected to it.
Figure 10 is a view taken from line 10—10 of Figure 9.
Figure 11 is a side elevation view of a fragment of the ramp structure showing the lower latch unit.
Figure 12 is a sectional view of the latch unit shown in Figure 11, taken along line 12—12 of that figure.

A latch element holding member including a bar, rod or tube 44, having an end-opening slot in one end to embrace a pin 45 mounted on tube 40, has its other end pivoted at 44' to a portion of the latch member 42 spaced from and swingable about its pivot 43 as the latch element swings between its latched and released positions. A compression spring 46 encircling the latch-holding member bears against washers, one engaging the latch member and the other engaging the pin 45, to hold the member alternately in its latched position, in which it is shown in Figures 8 and 9, and in its released position swung through an angle of about 90°. Release cable 47, also connected to a portion of the latch member offset a substantial distance from its rotative axis, may be pulled to rotate the latch member about its pivot axis. The resultant swinging of the latch member compresses spring 46 as the pivot connection 44' between the latch element's holding member and the latch member approaches pin 45, until such pivot connection is swung into alignment between such pin and the latch member pivot 43. Further swinging of the latch member will move the resilient holding member past its dead center so that its spring will snap the latch member on over into released position, and thereafter will retain it in such position.

Guided by tube 40 for reciprocation lengthwise within it is a plunger 48 pressed by spring 49 into extended position beyond the lower end of such tube. Outward movement of this plunger is limited, so that it cannot interfere with swinging of the latch element 42 into latching position by engagement with either of its fingers 42' or 42". This plunger may move downward far enough, however, to press against the ramp rod 26 and serve as a keeper to prevent it escaping inadvertently from engagement with the hook of latch finger 42'.

The lower latch unit 5 is carried by the supporting ramp section 2 to engage the supported ramp section 20 for holding it in position folded close alongside the supporting ramp section. Such latch unit is mounted on tubes 27 and 28 supported at their ends by suitable mounting plates 30. Encircling tube 27 are sleeves 50 secured rigidly to it in spaced relationship and carrying two fixed stop lugs 51 projecting laterally from such tube in parallel spaced positions. Journaled on tube 27 between sleeves 50 and held spaced from them by suitable spacers 52 is the latch element 53. This latch element is of the same general type and shape as latch element 42 of the upper latch unit, previously described, including two side plates and being bifurcated to form a pointed, hooked, ramp-engaging finger 53' and a curved resetting finger 53" disposed in spaced relationship. Such hooked finger may engage a rod 29 carried by the supported ramp section at a location spaced a substantial distance from the hinge 21. Movement of such rod toward the supporting ramp section is limited by its engagement with the stop lugs 51.

Latch element 53, like the upper latch element 2, is held either in its latching or in its released position by a latch element holding member including a rod or a bar 54 having one end passing slidably through tube 28 and its other end pivoted to the latch element by a pivot 54' offset from the rotative axis of the latch member defined by rod 27. A compression spring 55, encircling such rod or bar, bears against tube 28 to apply a resilient force to the latch element 53, for holding it alternately in its latching and released positions. Suitable stop mechanism (not shown) is provided to limit swinging of the latch member beyond its latching and released positions. In this instance it would be inconvenient to connect releasing mechanism for the latch member directly between it and a control station in the fuselage. Consequently it is swung by a latch trip or release carried by the ramp section 2 in position for actuation by swinging of the upper latch member from latching to released position when the ramp sections are in stored position.

Preferably keeper mechanism for preventing inadvertent escape of the supported ramp section rod 29 from the hook of latch element finger 53' of the lower latch mechanism is associated with the latch-releasing device. Thus a latch-releasing or trip rod 6 may be connected to a lever arm 60 which is integral with a keeper bar 56, such arm and bar elements being journaled on tube 27. A spring 57, preferably of the tension type, connected between the ramp section 2 and the keeper bar, continuously urges the latter against a stop block 58 carried by the latch element 53 adjacent to the root end of its finger 53" and bridging the recess between the two spaced side plates of the latch element. In this position escape of the supported ramp section's bar 29 from the hooked finger 53' is prevented.

A pin 59 bridging between the side plates of the latch element 53 is spaced from the keeper bar 56 a distance such that it will be engaged initially by the keeper bar when it has been swung by tension on release rod 6 in opposition to the tension of spring 57 sufficiently to release rod 29. As the release rod is pulled farther, the keeper bar pressing against pin 59 will swing the latch member from its latching position of Figure 11 into released position. Spring 55 will resist initial swinging of the latch member, but when the pivot 54' has crossed a line joining tubes 28 and 27, such spring will snap the latch member on over into released position through a total angle of about 90 degrees.

Tension is applied to the trip rod 6 by swinging of link 61 by which the end of this rod remote from latch element 53 is connected to the swinging end of ramp section 2. This link is pivoted to the ramp section by a pin 62 also forming a pivot for a lever 63. One end of this lever is positioned for engagement by the finger 42'' of the latch element 42 as it swings from latching position into released position. The other end of this lever bears against link 61 to swing it conjointly with swinging of the lever, effected by swinging of the latch member 42, for pulling trip rod 6 to swing latch element 53 into its released position.

Assuming that the ramp sections 2 and 20 are in their lowered aligned position shown in Figure 1, they may be moved into stored position by first pulling upward cable 16 until hook 17 reaches the carriage 15, and then rolling the carriage along its track toward a position over hinge 22 connecting the ramp element to the fuselage. Upon initiation of such ramp movement the stand 3 will be lifted with the ramp sections while maintaining the depending position shown in Figure 4. Ramp sections 20 will droop progressively farther until cable 16, by movement of carriage 15, crosses over the axis of hinges 21. Thereafter such ramp section will engage stand 3, and the lower ends of both of these members will be swung upward toward ramp section 2 until they reach the stored position shown in Figure 3, in which the two sections of each ramp unit lie close alongside each other with the stand between them. The base of the stand in this position, as shown, is rotated to lie parallel to the plate 37. During such upward swinging of the two ramp units they may be slid toward each other along the rods of hinges 22, as explained previously. The weight of the ramp units being lifted by the single cable 18, as shown in Fig. 2, produces force components tending to move these ramp sections toward each other.

As the rod 26 on the upwardly swinging end of ramp section 2 strikes the point of the latch element finger 42', such finger will be wedged aside against the force of spring 46 until this end of the ramp section has been raised sufficiently for the rod to be engaged by the hook of the latch finger. Just prior to reaching that position the rod will engage plunger 48 and press it upwardly against the force of spring 49. The spring 46 thereupon returns the latch element to engage its hooked finger with rod 26 in the manner shown in Fig. 9.

Continued tension on cable 18 will press rod 29, carried by the underside of ramp section 20 near its lower end, against the pointed finger 53' of the lower latch member 53. Such pressure first will wedge the hooked finger of the latch element to the left in Figure 11 against the force of spring 55, and thereafter will engage the inclined end of keeper bar 56 and swing it to the left against the tension of spring 57 by a wedging action. When the bar 29 has been raised this far it will clear the hook of the latch element finger 53' so that the latch element will be swung back by spring 55 into the rod-holding position shown in Figure 11. The tension on cable 18 may then be released, whereupon rod 29 will drop down into the notch of the latch member finger, enabling spring 57 to return the keeper to its operative position shown.

It will be evident that, following the ramp lifting operation described, the upper latch mechanism 4 will support directly the swinging end of the supporting section 2 of each ramp unit, and the supported section 20 of each ramp unit will be held folded alongside the respective supporting ramp sections, without reliance upon cable 18. Because of the weight of the ramps acting on the hooks and of the force of spring 49 acting on plunger 48 of both upper latch mechanisms, the latch release or trip cable 47 cannot be pulled to swing their latch elements 42 into released position as long as they support the weight of the ramp structure. It is impossible, therefore, for the ramp to be released by an inadvertent pull on the trip wire, which would allow the ramp units to fall downward uncontrolled by cables 16 and 18. On the contrary, a lifting force must be applied to these cables substantially equal to that required to hoist the ramp units and overcome the force of springs 49 before they can be released for lowering.

In the lowering operation, initial raising of the swinging end of ramp section 2 by pulling on cable 18 will press rod 26 against plunger 48, compressing spring 49 to lift the rod out of the notch of the hooked latch member finger 42'. This operation alone also will not release the ramp unit until the release wire 47 has been pulled to swing the latch element 42 from its latching position into its released position. Such swinging of the upper latch member will cause its other finger 42'' to strike lever 63, in turn swinging link 61 to pull trip rod 6. Such movement of the trip rod first will swing the keeper bar 56 away from its holding position above rod 29 and into engagement with pin 59. Since tension is being maintained on cable 18, rod 29 immediately will be moved upward out of the notch of the hooked latch member finger 53', so that the pull on the trip rod also will swing the latching member 53 into its released position by the pressure of bar 56 against pin 59.

Each ramp unit is thus released from holding engagement by its two latching elements, but rods 26 and 29 of each unit are still received between the bifurcations of their respective latch elements, the curved finger of each such latch element extending beneath its respective rod. As each rod 26 strikes the finger 42'' below it during downward swinging of the supporting sections, each upper latch element 42 will be reset by being swung from its released position into its latching position, but by that time such rod will have passed below the hooked finger 42'. Until the ramp units are again raised into stored position, each of these latch members will be held in its latching position by its spring 46.

Similarly, as each supported ramp section 20 swings away from the supporting ramp section 2 alongside it, each rod 29 will strike the curved resetting finger 53'' of its latch element 53. Since, by that time, latch members 42 will have been reset, followed by springs 57 returning the keeper elements 56 and trip rods 6 to the dotted line positions of Figure 11, the lower latch members 53 will be swung from released position into latching position by pressure of rods 29 against their fingers 53''. These latch members likewise will be held in this position by springs 55 until the ramp units are raised again.

After the ramp units have been lowered into the position shown in Figure 1 the stands 3 may be contracted by swinging their lower sections 33 downward to the broken line position shown in Figure 6, as described previously, to dispose the ramp sections 2 and 20 in dihedral relationship. Since the stands are received between the two ramp sections in stored position, as shown in Figure 3, however, it is necessary to alter them to their extended condition again before the ramp units are lifted into stored position, because otherwise the ramp sections can not be folded together. During adjustment of the stands between their extended and contracted conditions, the weight of the ramp units may be supported by cables 16 and 18 in the manner shown in Figure 1.

We claim as our invention:

1. A cargo ramp structure for supporting cargo being loaded on or unloaded from a vehicle, comprising two trackway units, each including a supporting ramp section, hinge means supporting one end of such section from the vehicle for swinging of its other end upwardly relative to the vehicle into stored position, and a supported ramp section having one end hinged to the swinging end of said supporting ramp section and swingable relative thereto into position folded alongside it, the hinge axes of said supporting ramp sections being substantially aligned, and means cooperating with said hinge means for guiding said trackway units for relative sidewise or edgewise approach movement to facilitate movement thereof into stored position.

2. A cargo ramp structure for supporting cargo being loaded on or unloaded from a vehicle, comprising a supporting ramp section having one end hingedly supported from the vehicle for swinging of its other end relative to the vehicle, a supported ramp section having one end hinged to the swinging end of said supporting ramp section, and ramp lifting means connected to said supported ramp section and operable simultaneously to swing said supporting ramp section upward relative to the vehicle and to positively swing said supported ramp section downward relative to and beneath said supporting ramp section into position folded contiguously to the latter, for movement of the ramp structure as a whole into stored position wherein said supporting ramp section extends upwardly at an incline from its hingedly supported end, and said supported ramp section extends downwardly from the swinging end of said supporting ramp section and generally parallel thereto.

3. A cargo ramp structure for supporting cargo being loaded on or unloaded from a vehicle, comprising a supporting ramp section having one end hingedly supported from the vehicle for swinging of its other end upward relative to the vehicle into stored position inclined upward from its hinged end, a supported ramp section, hinge means connecting one end of said supported ramp section to the swinging end of said supporting ramp section, and ramp lifting means for connection to said supported ramp section adjacent to said hinge means at a location such that, by application of lifting force thereby to said supported ramp section, said lifting means will swing said supporting ramp section upward relative to the vehicle, and said supported ramp section will be swung positively by said lifting means downward relative to the supporting ramp section, while raising said two ramp sections simultaneously.

4. A cargo ramp structure for supporting cargo being loaded on or unloaded from a vehicle, comprising a supporting ramp section having one end hingedly supported from the vehicle for swinging of its other end upward relative to the vehicle into stored position inclined upward from its hinged end, a supported ramp section, hinge means connecting one end of said supported ramp section to the swinging end of said supporting ramp section, a lifting cable connected to said supported ramp section adjacent to said hinge means at a location such that, by application of lifting force thereby to said supported ramp section, said lifting cable will swing said supporting ramp section upward relative to the vehicle, and lifting cable supporting means mounted for movement in a direction generally parallel to the plane of swing of said ramp, and operable to shift said lifting cable generally in the direction from swinging end to hingedly supported end of said supporting ramp section, as said supporting ramp section is swung upwardly, to swing said supported ramp section positively first downward relative to the supporting ramp section and then upward relative to it to lie close alongside it.

5. A cargo ramp structure for supporting cargo being loaded on or unloaded from a vehicle, comprising a supporting ramp section, a supported ramp section, hinge means connecting one end of said supported ramp section to one end of said supporting ramp section for swinging of said supported ramp section into position folded alongside said supporting ramp section for storage purposes, and a stand having its upper end pivotally connected to said hinge means adapted to support the same directly from the ground, and to guide said stand for folding movement relative to said two ramp sections into a position alongside such ramp sections when they are in folded position.

6. A cargo ramp structure for supporting cargo being loaded on or unloaded from a vehicle, comprising a supporting ramp section having one end hingedly supported from the vehicle for upward swinging into stored position, a supported ramp section, hinge means having its axis of swing substantially parallel to the axis of swing of said supporting ramp section, connecting one end of said supported ramp section to the swinging end of said supporting ramp section for swinging of said supported ramp section into position folded alongside said supporting ramp section for storage purposes, and a stand having its upper end pivotally connected to said hinge means adapted to support the same directly from the ground, and to guide said stand for folding movement relative to said two ramp sections into a position alongside such ramp sections when they are in folded position.

7. A cargo ramp structure for supporting cargo being loaded on or unloaded from a vehicle, comprising a supporting ramp section having one end hingedly supported from the vehicle for swinging of its other end upward relative to the vehicle, a supported ramp section, hinge means connecting one end of said supported ramp section to the swinging end of said supporting ramp section, means operable simultaneously to swing said supporting ramp section upward relative to the vehicle and to swing said supported ramp section downward relative to said supporting ramp section into position folded alongside it for movement of the ramp into stored position, wherein said supporting ramp section extends upwardly from its end supported from the vehicle, and said supported ramp section extends downwardly from the swinging end of said supporting ramp section, and a stand having its upward end pivotally connected to said hinge means and adapted to support the same directly from the ground when said supporting ramp section is in a downwardly swung position, and swingable relative to said supported ramp section and said supporting ramp section to lie therebetween when they are disposed in such folded position.

8. A cargo ramp structure for supporting cargo being loaded on or unloaded from a vehicle, comprising a supporting ramp section having one end hingedly supported from the vehicle, a supported ramp section having one end hingedly connected to the other end of the supporting ramp section, means operable to swing said supporting ramp section upward about its end hingedly supported from the vehicle from a lower operative position into an upper stored position and simultaneously to swing said supported ramp ramp section downward relative to said supporting ramp section into position folded alongside it, latch means carried by the vehicle, engageable with the swinging end of said supporting ramp section in stored position and operable to retain it in such position, and release means operable to release said latch means for downward swinging of said supporting ramp section from stored position.

9. A cargo ramp structure for supporting cargo being loaded on or unloaded from a vehicle, comprising a supporting ramp section having one end hingedly supported from the vehicle, a supported ramp section having one end hingedly connected to the other end of the supporting ramp section, means operable to swing said supporting ramp section upward about its end hingedly supported from the vehicle from a lower operative position into an upper stored position and simultaneously to swing said supported ramp section downward relative to said supporting ramp section into position folded therebeneath alongside it, latch means carried by the vehicle, engageable with the swinging end of said supporting ramp section in stored position and operable to retain it in such position, latch means carried by the supporting ramp section and engageable with said supported ramp section to hold said supported ramp section in folded relationship alongside and beneath said supporting ramp section, and release means operable to release said first latch means for downward swinging of said supporting ramp section from stored position, and release means operable to release said second latch means for relative unfolding movement of said ramp sections, and operated by releasing movement of said first latch means actuated by said first release means.

10. A cargo ramp structure for supporting cargo being loaded on or unloaded from a vehicle, comprising a supporting ramp section, a supported ramp section, hinge means interconnecting adjacent ends of said ramp sections for relative swinging of said sections into a position wherein said supported ramp section is folded alongside said supporting ramp section, latch means located a substantial distance from said hinge means and operable to interconnect said supporting ramp section and said supported ramp section to maintain them in relatively folded relationship, and trip means extending from said latch means substantially to said hinge means, and operable by manipulation of the portion of said trip means adjacent to said hinge means to release said latch means for relative unfolding movement of said ramp sections.

11. A cargo ramp structure for supporting cargo being loaded on or unloaded from a vehicle, comprising a supporting ramp section having one end hingedly supported from the vehicle, a supported ramp section, hinge means interconnecting the other end of said supporting ramp section and one end of said supported ramp section, means operable to swing said supporting ramp section upward about its end hingedly supported from the vehicle from operative position to stored position and simultaneously to swing said supported ramp section downward relative to said supporting ramp section into position folded alongside and beneath it, latch means carried by said supporting ramp section and engageable with a portion of said supported ramp section remote from said hinge means to hold said supported ramp section in folded relationship alongside and beneath said supporting ramp section, and trip means extending from said latch means substantially to said hinge means, and operable by manipulation of the portion of said trip means adjacent to said hinge means to release said latch means for relative unfolding movement of said ramp sections.

12. A cargo ramp structure for supporting cargo being loaded on or unloaded from a vehicle, comprising a supporting ramp section having one end hingedly supported from the vehicle for swinging of its other end, a supported ramp section, hinge means interconnecting an end of said supported ramp section and the swinging end of said supporting ramp section, means operable to swing said supporting ramp section about its end hingedly supported from the vehicle from a lower operative position into an upper stored position and simultaneously to swing said supported ramp section downward relative to said supporting ramp section into position folded alongside and beneath it, latch means carried by the vehicle engageable with the swinging end of said supporting ramp section and operable to retain said section in upwardly swung position, latch means carried by said supporting ramp section and engageable with a portion of said supported ramp section remote from said hinge means to hold said supported ramp section in folded relationship alongside and beneath said supporting ramp section, release means operable to release said first latch means for downward swinging of said supporting ramp section, and trip means extending between said second latch means and a location adjacent to said hinge means and operable by engagement of said first latch means therewith upon actuation thereof by said release means to release said second latch means for relative unfolding movement of said ramp sections.

13. A cargo ramp structure for supporting cargo being loaded on or unloaded from a vehicle, comprising a supporting ramp section, a supported ramp section, hinge means interconnecting adjacent ends of said ramp sections for relative swinging of said sections into a position wherein said supported ramp section is folded alongside said supporting ramp section, latch means located a substantial distance from said hinge means and operable to interconnect said supporting ramp section and said supported ramp section to maintain them in relatively folded relationship, and trip means operable to move said latch means into released position for relative unfolding movement of said ramp sections, said latch means incorporating resetting means operable to reset said latch means from released position into latching position by relative unfolding movement of said ramp sections.

14. A cargo loading ramp structure for supporting cargo being loaded or unloaded from a vehicle, comprising a ramp element having one end hingedly supported from the vehicle for swinging of its other end relative to the vehicle between a downwardly swung operative position and an upwardly swung stored position, latch means carried by the vehicle, engageable with the swinging end of said ramp element and operable to retain it in stored position, and release means operable to move said latch means into released position for downward swinging of said ramp element from stored position, said latch means incorporating resetting means operable to reset said latch means from released position into latching position by downward swinging movement of said ramp element.

15. A cargo ramp structure for supporting cargo being loaded on or unloaded from a vehicle, comprising a ramp element having one end hingedly supported from the vehicle for swinging of its other end from a lower operative position into an upper stored position, lifting means operable to swing said ramp element upward relative to the vehicle into stored position, latch means engageable with said ramp element in its upwardly swung position to maintain said ramp element therein, and latch releasing means operable only during the application of a lifting force to said ramp element by said lifting means to release said latch means for downward swinging of said ramp element, said latch means incorporating resetting means operable to reset said latch means from released position into latching position by downward swinging movement of said ramp element.

16. A cargo ramp structure for supporting cargo being loaded on or unloaded from a vehicle, comprising a supporting ramp section having one end hingedly supported from the vehicle for swinging of its other end between a lower operative position and an upper stored position, a supported ramp section, hinge means interconnecting the swinging end of said supporting ramp section and one end of said supported ramp section, a stand having its upper end pivotally connected to said hinge means and adapted to support the same directly from the ground when said supporting ramp section is in its operative position, lifting means operable simultaneously to swing said supporting ramp section from its operative position into its stored position, to swing said supported ramp section downward relative to said supporting ramp section into folded position alongside and beneath it, and to swing said stand into position folded between said supporting ramp section and said supported ramp section, latch means carried by the vehicle, engageable with the swinging end of said supporting ramp section in stored position and operable to retain it in such position, latch means carried by said supporting ramp section, located a substantial distance from said hinge means and engageable with said supported ramp section in folded position to maintain it in such position, latch releasing means operable only during the application of a lifting force to said ramp sections by said lifting means to swing said first latch means from latching position into released position for downward swinging of said supporting ramp section, and trip means carried by said supporting ramp section, extending from said second latch means substantially to said hinge means, and operable by engagement of said first latch means therewith upon actuation by said release means, to release said second latch means for relative unfolding movement of said ramp sections, said first latch means incorporating resetting means operable to reset said first latch means from released position into latching position by downward swinging movement of said supporting ramp section relative to the vehicle, and said second latch means incorporating resetting means operable to reset said second latch means from released position into latching position by relative unfolding movement of said ramp sections.

17. The cargo loading ramp structure defined in claim 16, and keeper means for the first latch means, movable out of holding position by application of a lifting force to the ramp sections by the lifting means.

18. A cargo ramp structure for supporting cargo being loaded on or unloaded from a vehicle, comprising a supporting ramp section having one end hingedly connected to the vehicle, a supported ramp section having one end hingedly connected to the other end of the supporting ramp section, means operable to swing said supporting ramp section upward about its hinged end from a lower operative position into an upper stored position and simultaneously to swing said supported ramp section downward relative to said supporting ramp section into position folded contiguously thereberneath, latch means carried by the vehicle and engageable with a coacting latch member carried by one of said ramp sections in the vicinity of their hingedly interconnected ends, when the latter are in upswung position, to retain such ends so upswung, further latch means carried by said one of said ramp sections and engageable with the other ramp section to hold said supported ramp section in folded relationship alongside and beneath said supporting ramp section, release means operable to release said first latch means for downward swinging of said supporting ramp section from upswung position, and release means operable to release said second latch means for relative unfolding movement of said ramp sections, and operated by releasing movement of said first latch means actuated by said first release means.

19. In a cargo ramp system or the like for a cargo vehicle, a ramp member, latch mechanism operable to secure said ramp member in stored position with respect to the vehicle, and to release such member for swinging into operative position therefrom, said ramp member having a latching element cooperable with said latch mechanism, said latch mechanism comprising a latch member supported for engagement by said ramp member latching element and for pivoting between ramp-latching and ramp-release positions, said latch member including a latch hook and a reset finger extending in general parallel relation away from the point of pivot of said latch member, said hook opening toward said finger, said hook and finger defining a ramp-element-receiving recess therebetween, spring means coacting with said latch member, operable to urge such member resiliently into ramp-latching and release positions, and to yield to permit movement thereof between such positions, and latch release means operable to rock said latch element from latching position hooked on said ramp element into release position releasing such element, by yielding of said spring means, to effect slidable releasing engagement between said reset finger and said ramp element, operable to reset such latch member for re-latching by said ramp element by swinging of said ramp member from stored position toward operative position thereof.

20. Latch mechanism as defined in claim 19 and further comprising spring-urged keeper means operable to press the ramp member into latched engagement with the latch hook, and yieldable to permit withdrawing positively such ramp member from hook engagement and further into the latch member's recess, to enable operation of the latch release means rocking the latch member into ramp-releasing position.

EDWIN M. SANTEE.
RALPH H. BURKHARD.
WILLIAM J. HESS.

REFERENCES CITED

The following references are of record in the file of this patent:

UNITED STATES PATENTS

| Number | Name | Date |
|---|---|---|
| 963,918 | Miller | July 12, 1910 |
| 2,121,121 | Dempster | June 21, 1938 |
| 2,190,708 | Fowler | Feb. 20, 1940 |
| 2,215,631 | Young | Sept. 24, 1940 |
| 2,402,283 | Hewitt | June 18, 1946 |
| 2,424,862 | Stuart | July 29, 1947 |
| 2,425,972 | Watter | Aug. 19, 1947 |

FOREIGN PATENTS

| Number | Country | Date |
|---|---|---|
| 243,628 | Great Britain | Dec. 3, 1925 |
| 309,065 | Germany | Dec. 10, 1918 |
| 383,864 | France | Jan. 20, 1908 |
| 513,598 | Great Britain | Oct. 17, 1939 |
| 718,231 | France | Nov. 4, 1931 |